United States Patent Office 3,845,225
Patented Oct. 29, 1974

3,845,225
HALOGENATED AROMATIC COMPOUND HAVING SWEETENING PROPERTIES
Guy A. Crosby, Palo Alto, and Gerald C. Peters, Redwood City, Calif., assignors to Dynapol
No Drawing. Filed June 18, 1973, Ser. No. 370,646
Int. Cl. A23l 1/26
U.S. Cl. 426—217                    2 Claims

ABSTRACT OF THE DISCLOSURE

A compound of the formula

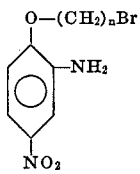

wherein $n$ is 2 to 4 are disclosed. The compounds are active as sweetening agents.

BACKGROUND OF THE INVENTION

The present invention pertains to new and useful compounds of the general formula:

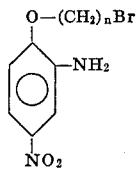

wherein $n$ is a positive integer of 2 to 4 inclusive. Included in $(CH_2)_n$ are the straight and branched chain alkylene groups such as ethylene, propylene, isopropylene, butylene and the like. The compounds of the invention are active sweeteners, and they can impart sweetness to material in need of sweetening. The invention also relates to compositions and methods for using same.

The novel compounds of the invention are synthesized according to the following reaction sequence, wherein $n$ is as previously defined.

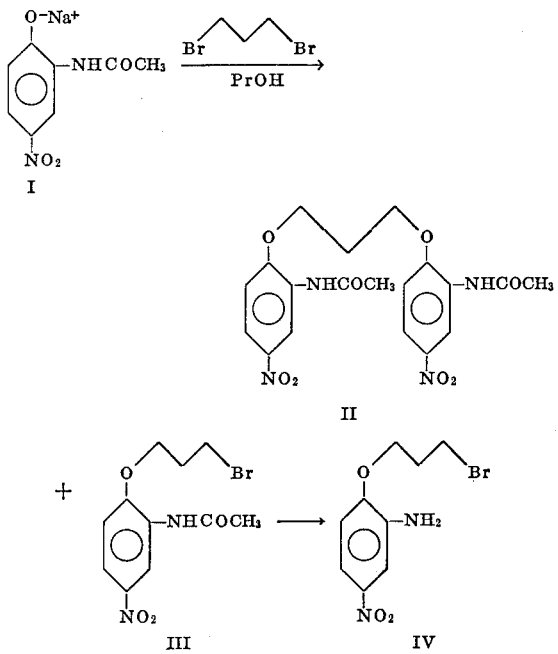

It is to be understood that the just depicted reaction sequence is for illustrating the spirit of the invention, and that it is not to be construed as limited thereto. The invention is further illustrated by the following example:

EXAMPLE

Preparation of sodium 2 - acetamido - 4 - nitrophenoxide is as follows:

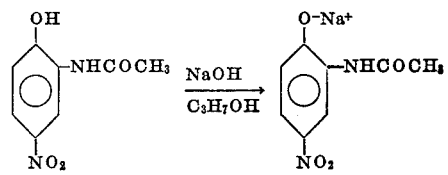

The sodium salt of 2 - acetamido - 4 - nitrophenol is prepared by heating 8.32 g. of the starting material as shown above in 850 ml. of n-propanol to near boiling for 30 to 60 minutes to effect solution, followed by cooling to about 50° C. Next, 44 ml. of 1 N sodium hydroxide in n-propanol is added and the solution stirred to insure mixing and reaction of the reactants. After cooling and stirring for 1 hr. the orange-red solution is evaporated to about ⅕ volume. Then, 500 ml. of ether is added with rapid stirring to precipitate an orange solid that is collected on a filter and air dried to give 9.61 g. of the sodium salt (I).

Preparation of 1 - (3 - bromopropoxy) - 2 - acetamido-4-nitrobenzene.

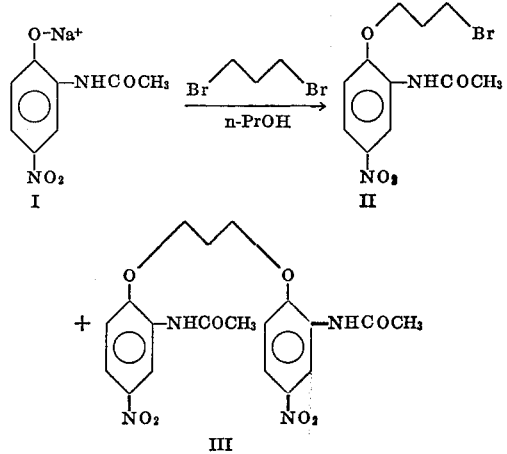

To the sodium salt (I; 23.8 mmoles) in 150 ml. of 1-propanol, there is added with stirring at reflux 1,3-dibromopropane (49.6 mmoles). After stirring and refluxing for 10 hours, the reaction was diluted with ethyl acetate (250 ml.), washed with saturated sodium bicarbonate solution until no more color was extracted, dried over anhydrous magnesium sulfate and evaporated to yield 1.50 g. of crude product. Chromatography with benzene solvent of the product on silica gel (70 g.; elution with 2%, 4% and 6% ethylacetate in benzene) gave 420 mg. of II and lesser amounts of III.

Preparation of 2 - (3 - bromopropoxy) - 5 - nitroaniline.

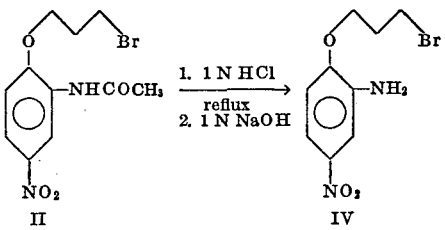

A mixture of 1 - (3 - bromopropoxy) - 2 - acetamido - 4 - nitrobenzene (II; 1.0 mmole) in 1 N hydrochloric acid (20 ml.) was stirred and refluxed for 2 hrs and then diluted with distilled water. Then, 1 N sodium hydroxide was added until a precipitate formed which was extracted twice with ethyl acetate. The latter was dried over anhydrous magnesium sulfate and evaporated to yield 2-(3-bromopropoxy) - 5 - nitroaniline (IV) which has a sweet taste.

The halogenated sweetening compounds of the invention are useful for sweetening all types of useful materials. Representative materials which may be easily sweetened with the halogenated compounds include fruits, vegetables, juices, liquid preparations made from fruits and vegetables, meat products, meat products conventionally treated with sweetened liquors such as bacon and hams, milk products, chocolate dairy drink, egg nog, custards, angel food mixes, salad dressings, pickles, relishes, ice cream, sherbets, ices, ice milk products, feedstuffs, bakery products, avian foods, icing, zoological foods, confections, toppings, syrups, flavors, cakes, pastry, mixes, assorted beverages, carbonated soft drinks, fruit ades, wines, cough syrups, dental pastes, powders, foams, dental-retaining adhesives, tobacco products, adhesives for gumming stamps, and envelopes, or labels, and the like. The halogenated sweeteners of the invention are mixed with the materials to be sweetened in an amount required to attain the desired level of sweetness. Usually, because of their high degree of sweetness, they are used in lesser amounts than sucrose is correspondingly used in like materials. For example, they are generally used in concentrations of about 1% or less, usually less than 0.5%, and in most applications of 0.005% or the like. The addition can be on a volume or weight basis. Of course, higher or lower amounts can be used to attain a desired sweetness appropriate to the material. The technique of sweetening materials with the compounds of the invention is carried out by standard means. The sweeteners can be added directly to the material, or they can be incorporated with a diluent to increase their bulk so that smaller amounts of the compound may be metered into the diluent. As diluents, conventional diluents such as liquids or solids can be used. These include starch, sorbitol, sugar, citric acid or other like compatible materials.

The foregoing detailed description is given for clearness of understanding only and no unnecessary limitations should be understood therefrom for modifications will be obvious to those skilled in the art.

We claim:

1. A composition comprising a food and a sweetener therefor, said sweetener a compound of the formula

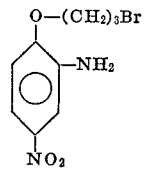

wherein the compound is added in an effective amount to sweeten food.

2. A method for sweetening food which comprises adding thereto an effective amount of a compound of the formula

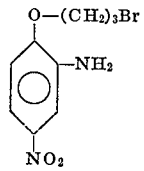

to sweeten said food.

OTHER REFERENCES

J1. *Farmaco Ed. Sc.*, P. E. Verkade, "On Organic Compounds with a Sweet and/or a Bitter Taste," 23(3), (1968), 248—291.

A. LOUIS MONACELL, Primary Examiner

E. L. MASSUNG, Assistant Examiner

U.S. Cl. X.R
260—575